United States Patent
Kim et al.

(10) Patent No.: US 7,724,616 B2
(45) Date of Patent: May 25, 2010

(54) OPTICAL RECORDING/REPRODUCING APPARATUS, MEDIUM, AND METHOD AND CONTROLLING APPARATUS, MEDIUM, AND METHOD THEREFOR

(75) Inventors: Bong-gi Kim, Suwon-si (KR); Soo-han Park, Yongin-si (KR); Jung-gug Pae, Suwon-si (KR); Chun-seong Park, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1371 days.

(21) Appl. No.: 11/159,179

(22) Filed: Jun. 23, 2005

(65) Prior Publication Data
US 2005/0286357 A1 Dec. 29, 2005

(30) Foreign Application Priority Data
Jun. 23, 2004 (KR) ........................ 10-2004-0047191

(51) Int. Cl.
*G11B 7/00* (2006.01)
(52) U.S. Cl. .............. 369/44.15; 369/44.11; 369/44.16; 369/53.19
(58) Field of Classification Search ................ 369/44.16
See application file for complete search history.

(56) References Cited

U.S. PATENT DOCUMENTS

| | | | |
|---|---|---|---|
| 6,134,058 A | 10/2000 | Mohri et al. | |
| 6,625,093 B1 | 9/2003 | Hong et al. | |
| 7,254,098 B2 * | 8/2007 | Pae et al. | 369/44.16 |
| 2002/0150002 A1 | 10/2002 | Pae et al. | |
| 2003/0147314 A1 | 8/2003 | Kondo et al. | |
| 2003/0156529 A1 | 8/2003 | Tajiri | |
| 2004/0004774 A1 * | 1/2004 | Fujita | 359/814 |
| 2004/0052180 A1 * | 3/2004 | Hong | 369/53.19 |

(Continued)

FOREIGN PATENT DOCUMENTS

EP 0 472 084 2/1992

(Continued)

OTHER PUBLICATIONS

European Search Report, mailed Jan. 23, 2007, and issued in corresponding European Patent Application No. 05253480.7-2210.

*Primary Examiner*—Lixi Chow
(74) *Attorney, Agent, or Firm*—Staas & Halsey LLP

(57) ABSTRACT

An optical recording/reproducing apparatus, medium, and method and a controlling apparatus, medium, and method thereof. The recording/reproducing apparatus includes an optical pickup actuator including a holder formed on a base, a blade connected to the holder with a plurality of elastic supporters, a pair of focus coils for operating the blade in a focus direction, track coils for operating the blade in a tracking direction, magnets, a memory for storing a lookup table for the height of the blade according to electric current, a lookup table for the tilt of the blade according to the electric current supplied to the focus coils, a lookup table for the actual tilt of an optical disk according to the height of the blade, and a controller for computing a tilt difference between the optical disk and the blade and controlling the electric currents supplied to the focus coils to compensate for the tilt difference.

25 Claims, 8 Drawing Sheets

U.S. PATENT DOCUMENTS

| | | | |
|---|---|---|---|
| 2004/0125711 A1* | 7/2004 | Sato et al. | 369/44.32 |
| 2004/0202075 A1* | 10/2004 | Ohguri | 369/53.14 |
| 2005/0036409 A1 | 2/2005 | Hong et al. | |
| 2005/0180277 A1* | 8/2005 | Iljima et al. | 369/44.32 |

FOREIGN PATENT DOCUMENTS

| | | |
|---|---|---|
| EP | 1 339 052 | 1/2003 |
| EP | 1 282 119 | 2/2003 |
| JP | 11-039683 | 2/1999 |
| KR | 10-2002-0006828 | 1/2002 |
| KR | 10-0403084 | 10/2003 |
| KR | 10-2005-0034762 | 4/2005 |

* cited by examiner

OPTICAL RECORDING/REPRODUCING APPARATUS, MEDIUM, AND METHOD AND CONTROLLING APPARATUS, MEDIUM, AND METHOD THEREFOR

CROSS-REFERENCE TO RELATED APPLICATIONS

This application claims the benefit of Korean Patent Application No. 2004-47191 filed Jun. 23, 2004, in the Korean Intellectual Property Office, the disclosure of which is incorporated herein by reference.

BACKGROUND OF THE INVENTION

1. Field of the Invention

Embodiments of the present invention relate to an optical recording/reproducing apparatus, medium, and method which is used to record and reproduce data with respect to a disk. More particularly, embodiments of the present invention relate to optical recording/reproducing apparatuses, media, and methods with improved responsive ability to a slanted optical disk, and a controlling apparatus, medium, and method therefor.

2. Description of the Related Art

Generally, a recording/reproducing apparatus records and/or reproduces data with respect of an storage medium, e.g., an optical recording medium such as an optical disk. Accordingly, an optical recording/reproducing apparatus may include an optical pickup device that records and/or reproduces data by irradiating light on a recording surface of the optical disk, in a radial direction of the disk, and receiving light reflected from the recording surface. The optical pickup device can include an actuator that operates an objective lens while maintaining it at a predetermined position and posture with respect to the recording surface of the disk.

FIG. 1 shows an optical pickup actuator set forth in Korean Patent No. 10-2003-0069459. Referring to FIG. 1, the optical pickup actuator includes a holder 11 fixed on a base 10, a blade 13 having an objective lens 12, a plurality of elastic supporters 14a and 14b, and a magnetic operator for moving the blade 13 in a focus direction (A) or a tracking direction (T).

The magnetic operator is provided with magnets 15, with the blade 13 disposed therebetween, internal yokes 16 and external yokes 17 formed in the base 10, and focus coils 18 and track coils 19 winding around the blade 13.

The elastic supporters include first elastic supporters 14a and second elastic supporters 14b disposed on respective internal and external circumferential sides of the optical pickup actuator with respect to the radial direction of the disk (D). The second elastic supporters 14b disposed on the external circumferential side are relatively longer than the first elastic supporters 14a on the internal circumferential side.

The above-described structure performs rolling as the blade 13 performs focusing, as necessary. Since the second elastic supporters 14b on the external circumferential side, which are relatively longer than the first elastic supporters 14a, are deformed more than the first elastic supporters 14a, the rolling occurs more along an external circumferential portion of the disc (D) than along an internal circumferential portion of the disc (D).

For example, if the disk (D) slants upwardly, in the direction of the external circumference of the disc (D), as illustrated in FIG. 2A, the blade 13 can be raised, and the rolling occurs in the positive (+) direction. Therefore, the blade 13 can properly focus on the surface of the disk confronted by the objective lens 12.

In case where the disk (D) is slanted downwardly in the circumferential direction, as illustrated in FIG. 2B, the blade 13 descends, and the rolling occurs in the negative (−) direction.

In the above-described structure, the extent of rolling of the blade 13, that is, the tilt of the blade 13, is based on an elastic difference between the first and second elastic supporters 14a and 14b. Therefore, the tilt of the blade 13 has a regular value generally, even though it varies slightly with the ascending and descending height of the blade 13 in the focusing direction. On the contrary, optical disks in actuality have quite diverse slants or tilts. Therefore, current actuators are not satisfactory for all kinds of optical disks as the elastic supporters 14a and 14b are designed to cope only with disks of average tilt.

In case of an optical disk with a steep tilt, the blade 13 cannot cope with the tilt, using the elastic supporters 14a and 14b in the aforementioned normal manners. Thus, data reading and/or recording characteristics of the optical disk becomes degraded.

SUMMARY OF THE INVENTION

An aspect of the present invention is to solve at least the above problems and/or disadvantages and to provide at least the advantages described below. Accordingly, an aspect of the present invention is to provide an optical recording/reproducing apparatus that can cope with a deflection of an optical disk, and a controlling method therefor.

To achieve the above and/or other aspects and advantages, embodiments of the present invention set forth an optical recording and/or reproducing apparatus, including an optical pickup actuator including a holder formed on a base, a blade including an objective lens and connected to the holder with a plurality of elastic supporters so that a posture of the blade can be changed to a predetermined tilt according to a variation in a height of the blade, a pair of focus coils for operating the blade in a focus direction, track coils for operating the blade in a tracking direction, and corresponding magnets, a memory to store at least one of a lookup table relating the height of the blade to an electric current supplied to at least one of the focus coils, a lookup table relating a tilt of the blade to at least the electric current supplied to the at least one focus coil, and a lookup table relating an actual tilt of an optical disk of the optical recording/reproducing apparatus to the height of the blade, and a controller to compute a tilt difference between the optical disk and the blade and controlling at least the electric current supplied to at least the one focus coil to compensate for the computed tilt difference by using data of at least the electric current supplied to at least the one focus coil and lookup table data stored in the memory.

The elastic supporters may include a plurality of internal circumferential elastic supporters disposed in the blade along an internal circumferential side of the optical disk connected to one of the focus coils, and a plurality of external circumferential elastic supporters disposed in the blade along an external circumferential side of the optical disk connected to another one of the focus coils, wherein the internal and external circumferential elastic supporters have different elastic coefficients so that the blade is slanted when the height of the blade is changed in the focus direction. In addition, the external circumferential elastic supporters may be longer than the internal circumferential elastic supporters. Further, the external circumferential elastic supporters may have a narrower diameter than the internal circumferential elastic supporters.

The focus coils may be arranged along a radial direction of the optical disk and connected to at least one adjacent elastic supporter electrically. In addition, at least another one adjacent elastic supporter may not be connected to the focus coils.

The optical pickup actuator may further include external yokes formed on the base and fixing the corresponding magnets, and internal yokes arranged between the focus coils to guide a movement of the blade.

To achieve the above and/or other aspects and advantages, embodiments of the present invention set forth an optical recording and/or reproducing apparatus, including an optical pickup actuator including a blade including an objective lens and movably connected to a holder with a plurality of elastic supporters, track coils and a pair of focus coils set up in the blade, and a magnet inclined to any one side of a center of a corresponding focus-directional operation force to move the blade in the focus direction and in a tracking direction with respect to an optical disk in the optical recording/reproducing apparatus by interaction with electric currents flowing through the focus and track coils and to change a posture of the blade to be tilted at a predetermined angle when a height of the blade is changed by a focus-directional operation force being applied asymmetrically to external and internal circumferences of the blade, with respect to the radial direction of the optical disk, a memory to store at least one of a lookup table for the height of the blade related to electric current supplied to the focus coils, a lookup table for a tilt of the blade related to an electric current supplied to at least one of the focus coils, and a lookup table for an actual tilt of the optical related to the height of the blade, and a controller to compute a tilt difference between the optical disk and the blade and to control the electric current supplied to the at least one focus coil to compensate for the computed tilt difference by using lookup data regarding the electric current supplied to the at least one focus coil stored in the memory.

The magnet may be inclined toward the external circumference of the blade.

To achieve the above and/or other aspects and advantages, embodiments of the present invention set forth a method for controlling an optical recording and/or reproducing apparatus, including controlling a posture of an optical pickup actuator, the optical pickup actuator including a blade with an objective lens movable in a focus direction by operation force generated by electric current supplied to focus coils, such that the posture of the blade is slant at a predetermined tilt based on a focus-directional change in height of the blade, acquiring a tilt difference between a tilt of the blade and a tilt of an optical disk when the height of the blade changes in a focus direction to record and/or reproduce data in/out of the optical disk, and compensating for the tilt difference by controlling an electric current supplied to at least one of the focus coils.

The controlling of the posture of the optical pickup actuator may further include fixing a holder on a base, connecting external and internal circumferences of the blade to the holder with a respective plurality of elastic supporters, each respective plurality of elastic supporters having different elastic coefficients, such that the blade is slanted in a radial direction of the optical disk when the height of the blade is changed, and setting up a magnetic operator including a pair of focus coils and track coils, and corresponding magnets to generate operation forces through interaction with the coils.

The setting up of the magnetic operator may further include winding the blade with the track coils, arranging the focus coils in the blade in the radial direction of the optical disk, and setting up the corresponding magnets, to generate the operation forces, in the base. The connecting of the external and internal circumference elastic supporters may further include connecting the external elastic supporters to be longer than the internal elastic supporters.

The acquiring of the tilt difference may further include acquiring a value of electric current supplied to at least one of the focus coils for a change in height of the blade when data is recorded and/or reproduced in/out of the optical disk, acquiring a lookup table for the change in height of the blade regarding the value of the electric current supplied to the at least one focus coil, acquiring a lookup table for a tilt of the blade regarding the value of the electric current supplied to the at least one focus coil, acquiring a lookup table for an actual tilt of the optical disk regarding the height of the blade, and acquiring the tilt difference between the tilt of the blade and the actual tilt of the optical disk.

The lookup tables acquired in the acquiring of the tilt difference may be pre-established and stored in a memory.

In addition, the controlling of the posture of the optical pickup actuator may further include fixing a holder on a base, connecting the blade to the holder with a plurality of elastic supporters such that the height of the blade can be changed, setting up a pair of focus coils in the blade, and setting up magnets on internal and external circumferential sides of the blade asymmetrically such that operation forces generated from interaction of at least one of the focus coils and at least one of the magnets acts on the internal and/or external circumferential sides of the blade asymmetrically with respect to the radial direction of the optical disk. In the setting up of the magnet of the internal and external circumferential sides of the blade may further include at least one of the magnets being inclined toward the external circumference of the blade.

Further, the optical pickup actuator further includes a base, respective pluralities of elastic supporters along external and internal circumferences of the blade and connected to the holder, each respective plurality of elastic supporters having different elastic coefficients, such that the tilt of the blade changes when the height of the blade changes, and a magnetic operator including a pair of focus coils, track coils, and corresponding magnets for generating corresponding operation forces through interaction with the focus and/or track coils. The magnetic operator may further include the track coils being wound on the blade, the focus coils being arranged in the blade in the radial direction of the optical disk, and magnets in the base.

In addition, elastic supporters along the external circumference may be longer than elastic supporters along the internal circumference of the blade. The optical pickup actuator may include a holder on a base, with the blade being connected to the holder through a plurality of elastic supporters so that the height of the blade can be changed, a pair of focus coils in the blade, and magnets along internal and external circumferential sides of the blade such that operation forces generated from an interaction of the magnets and the focus coils acts on the internal and external circumferential sides of the blade asymmetrically with respect to the radial direction of the optical disk. The magnets may be disposed to be inclined toward the external circumference of the blade.

To achieve the above and/or other aspects and advantages, embodiments of the present invention set forth a medium including computer readable code implementing embodiments of the present invention.

To achieve the above and/or other aspects and advantages, embodiments of the present invention set forth a medium including a lookup table relating a height of a blade to an electric current supplied to at least one focus coil of a pickup actuator, a lookup table relating a tilt of the blade to at least the electric current supplied to the one focus coil, and a lookup table relating an actual tilt of an optical disk of a recording/reproducing apparatus to the height of the blade in pickup actuator. To achieve the above and/or further aspects and advantages, embodiments of the present invention set forth a medium including at least one of lookup table according to embodiments of the present invention.

To achieve the above and/or other aspects and advantages, embodiments of the present invention set forth a pickup actuator system, for an optical recording and/or reproducing apparatus, including an optical pickup actuator, and including a holder formed on a base, a blade including an objective lens and connected to the holder with a plurality of elastic supporters so that a posture of the blade can be changed to a predetermined tilt according to a variation in a height of the blade, a pair of focus coils for operating the blade in a focus direction, track coils for operating the blade in a tracking direction, and corresponding magnets, including a memory to store at least one of a lookup table relating the height of the blade to an electric current supplied to at least one of the focus coils, a lookup table relating a tilt of the blade to at least the electric current supplied to the at least one focus coil, and a lookup table relating an actual tilt of an optical disk of the optical recording/reproducing apparatus to the height of the blade, and a controller to compute a tilt difference between the optical disk and the blade and controlling at least the electric current supplied to at least the one focus coil to compensate for the computed tilt difference by using data of at least the electric current supplied to at least the one focus coil and lookup table data stored in the memory.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
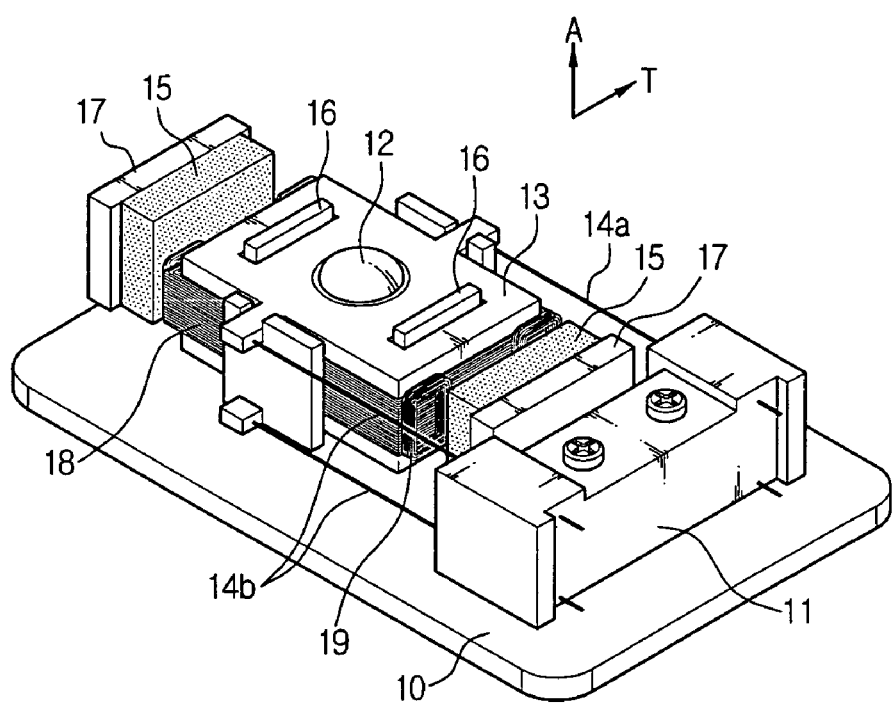
FIG. 1 is a perspective view showing a conventional optical pickup actuator.
Figure 2A:
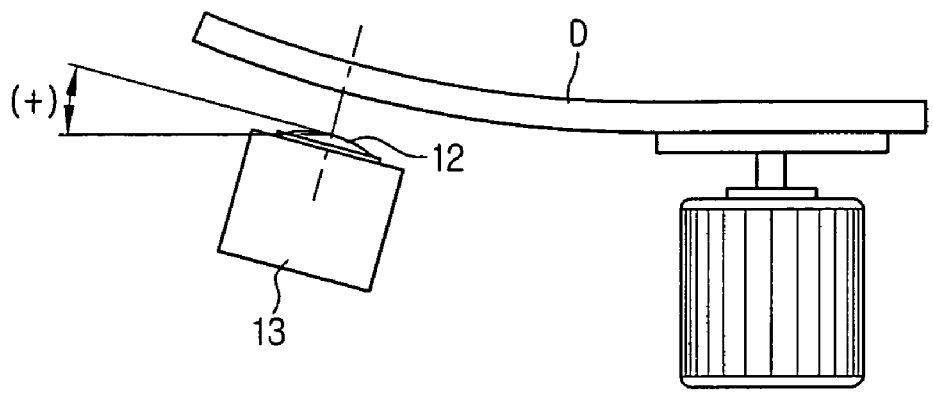
FIGS. 2A and 2B are diagrams illustrating effects of rolling of a blade in a radial direction of a disk during focusing.
Figure 2B:
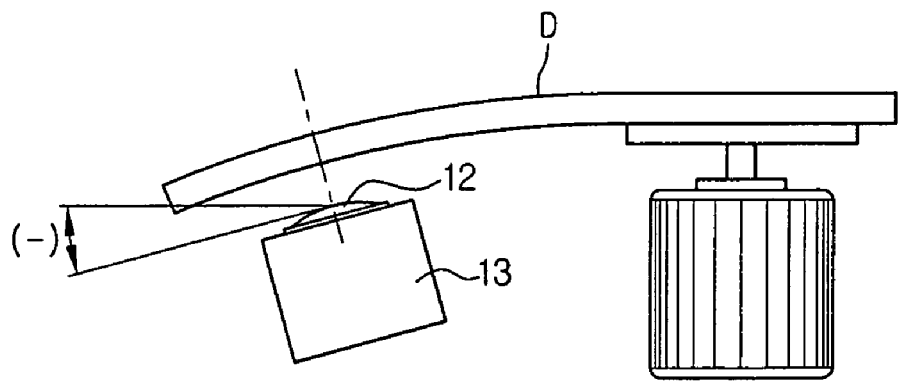

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
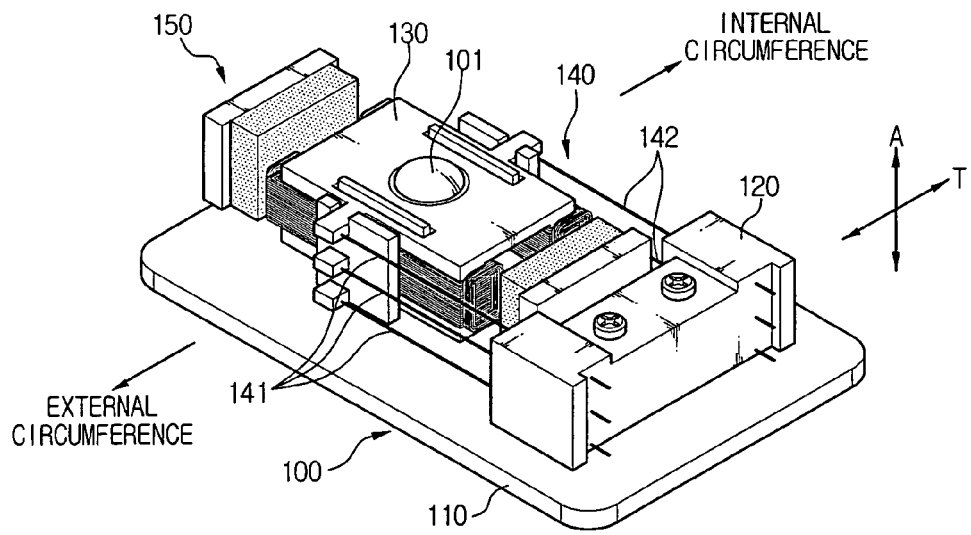
FIG. 3 is a perspective view illustrating an optical pickup actuator for an optical recording/reproducing apparatus, in accordance with an embodiment of the present invention.
Figure 4:
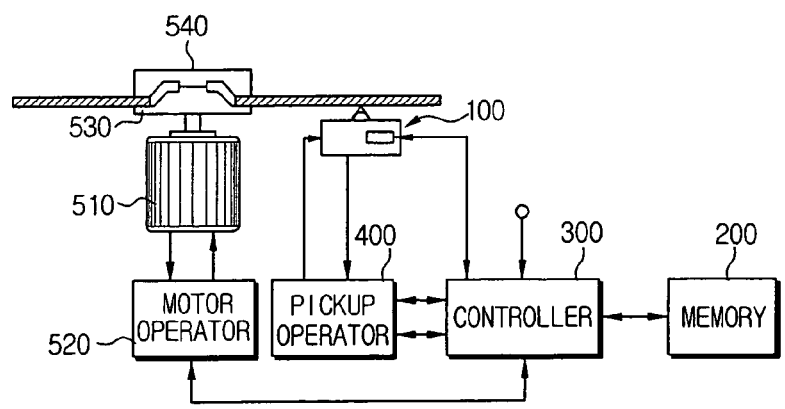
FIG. 4 is a block diagram depicting an optical recording/reproducing apparatus, in accordance with an embodiment of the present invention.

Referring to FIGS. 3 and 4, the optical recording/reproducing apparatus may include an optical pickup actuator 100, a memory 200, and a controller 300.

The optical pickup actuator 100 may include a base 110, a holder 120 fixed on one side of the base 110, a blade 130 onto which an objective lens 101 is mounted, a plurality of elastic supporters 140 movably connecting the blade 130 to the holder 120, and a magnetic operator 150 for moving the blade 130 in a focus direction (A) and in a tracking direction (T).

The optical pickup actuator 100 is movable by a pickup operator 400, under an optical disk (D). The pickup operator 400 is typically made up of a motor and rack gear and can move the optical pickup actuator 100 in the radial direction of the optical disk (D).

As illustrated in FIG. 4, a recording/reproducing apparatus for recording and/or reproducing data from disk (D) may include a spindle motor 510 for rotating the optical disk (D), and a motor operator 520 for controlling the rotation of the spindle motor 510, a turntable 530 on which the optical disk (D) is mounted, and a chucking unit 540 for clamping the optical disk (D) on the turntable 530.

The elastic supporters 140 include external circumferential elastic supporters 141 which are connected to the external circumference of the blade 130 and internal circumferential elastic supporters 142 connected to the internal circumference of the blade 130, both with respect to the radial direction of the optical disk (D). The number of provided internal and external circumferential elastic supporters 141 and 142 in this embodiment may be three, respectively. The external circumferential elastic supporters 141 may be longer than the internal circumferential elastic supporters 142. If the internal and external circumferential elastic supporters 141 and 142 have different lengths, different strains are applied to the internal and external circumferential elastic supporters 141 and 142, respectively, when the blade 130 moves in the focus direction (A). Thus, it is possible for the blade 130 to slant according to a predetermined tilt. Such an arrangement inducing the blade to cope with a slanted optical disk by having the elastic supporters 141 and 142 with different lengths is discussed in Korean Patent No. 10-2003-1169459, thus further description will be omitted herein.

Figure 5:
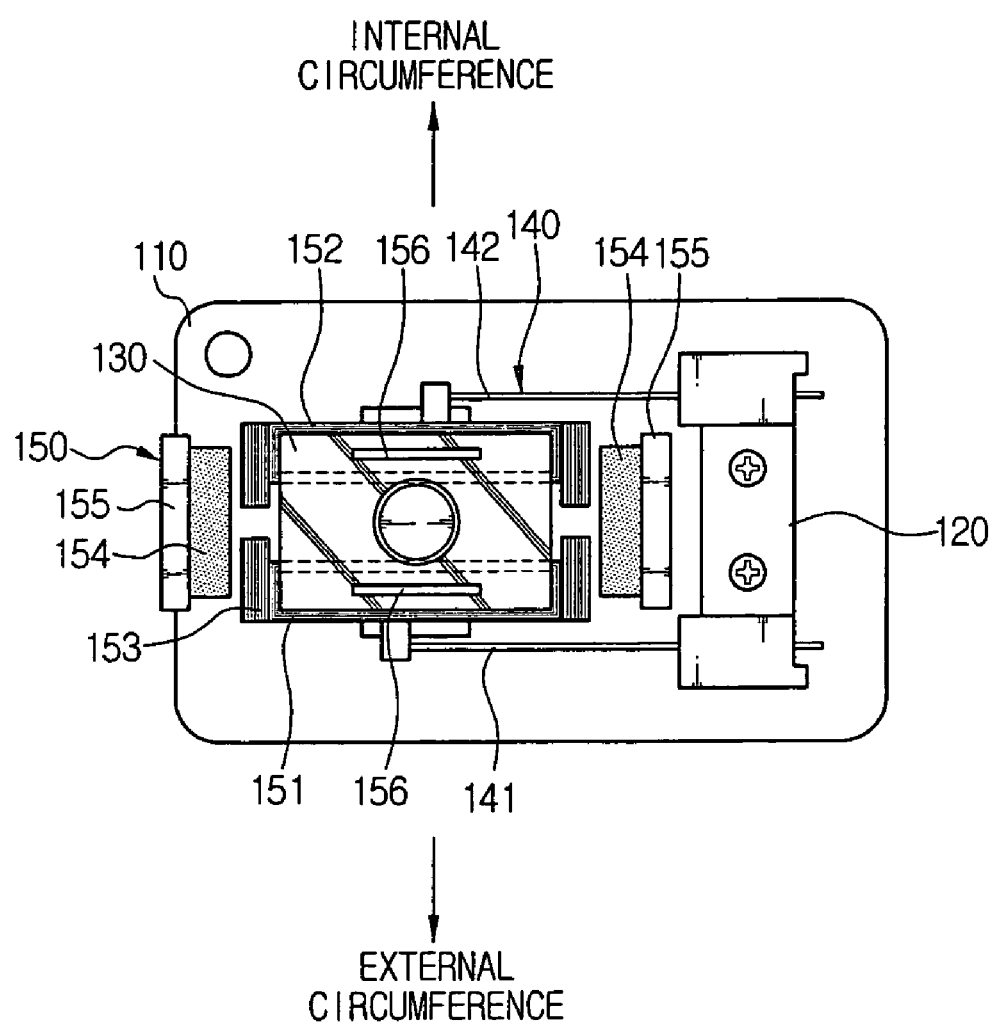
FIG. 5 is a plane view of an optical pickup actuator of FIG. 3, according to an embodiment of the present invention.

With reference to FIG. 5, the magnetic operator 150 includes a pair of focus coils 151 and 152 set up in the blade 130, track coils 153, a pair of magnets 154 set up in the base 110 to confront the track coils 153, and a pair of external yokes 155 and a pair of internal yokes 156 for supporting the magnets 154.

In FIG. 5, the focus coils 151 and 152 are respectively arranged on the external circumferential side and the internal circumferential side of the blade 130, in the radial direction of the optical disk (D). Each of the focus coils 151 and 152 operate independently. For the independent operation, each of the focus coils 151 and 152 may be connected to the controller 300, independently, so that electric current can be applied to each focus coil 151 and 152 differently. Preferably, according an embodiment of the present invention, the focus coil 151 on the external circumferential side is electrically connected to two of the external circumferential elastic supporters 141, with the electric current capable of being turned on or off. Also, the focus coil 152 on the internal circumferential side can be electrically connected to two of the internal circumferential elastic supporters 142, with the electric current capable of being turned on or off. In this structure, it is possible to generate focus operation forces of different sizes or in different directions on the internal and external circumferential sides of the blade 130 by independently supplying electric current of different intensities to each of the focus coils 151 and 152.

The track coils 153 are wound on both sides of the blade 130, and the blade 130 is connected to the remaining elastic supporters 141 and 142, which are not connected with the focus coils 151 and 152, as discussed above, and similarly can independently receive electric current. The blade 130 can be controlled to move in the tracking direction (T) by controlling the intensity and direction of the electric current supplied to the track coils 153. The external yokes 155 can be fixed on the base 110 to support the magnets 154. The internal yokes 156 can be fixed on the base 110 to guide the blade 130 to be moved in the focus direction (A), and disposed in the coiled center of the focus coils 151 and 152.

The memory 200 of FIG. 4 can store a lookup table, based on previous experiments, for the height variations of the blade 130 in relation to the intensities of the electric current supplied to the focus coils 151 and 152. In short, in order to focus light on a slanted optical disk (D), the height of the blade 130 is changed in the focus direction (A) to compensate for the degree of slant. The height of the blade 130 can be controlled by controlling the electric currents supplied to the focus coils 151 and 152. Accordingly, during previous experiments, the height of the blade 130 corresponding to the electric currents supplied to the focus coils 151 and 152 can be measured and stored for subsequent use in the lookup table for proper slant compensation.

Figure 7:
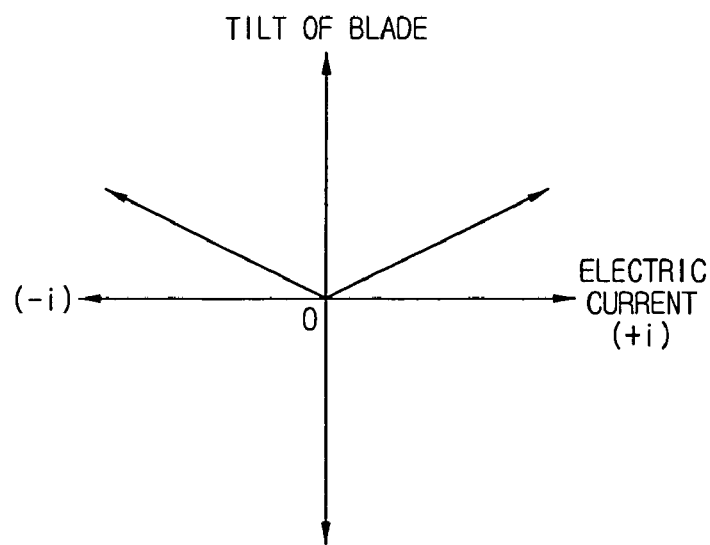

With reference to FIG. 7, the memory 200 of FIG. 4 can store the lookup table representing a variation in tilt of the blade 130 in relation to the intensities of the electric current supplied to the focus coils 151 and 152. That is, in the case of the slanted optical disk, if the intensities of the electric current supplied to the focus coils 151 and 152 are changed to move the blade 130 in the focus direction, the tilt of the blade 130 can be changed to perform proper focusing. The variation values stored in memory 200 can be obtained through experiments in the form of a lookup table, though embodiments of the present invention are not limited thereto.

Figure 8:
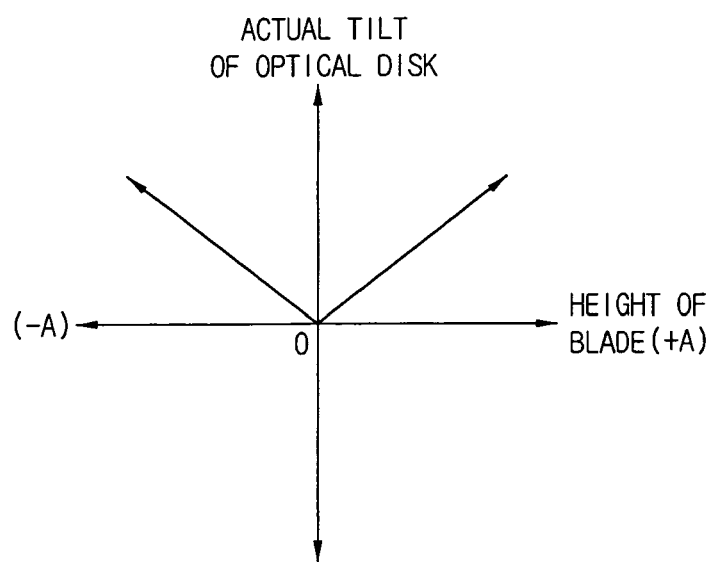

With reference to FIG. 8, the memory 200 of FIG. 4 can store a lookup table representing the variation in the actual tilt of the optical disk (D) in relation to the variation in the height of the blade 130 in the focus direction (A). That is, when the height of the blade 130 is controlled to focus light on the slanted optical disk (D), measurement values for the actual tilt of the optical disk according to the height of the blade 130 can be obtained from the lookup table.

A method for obtaining the lookup tables stored in the memory 200 will be described hereafter.

When electric currents are supplied to the focus coils 151 and 152, generated forces (F1) act between each of the focus coils 151 and 152 and the corresponding magnets 154, respectively, in the focus direction. The forces (F1) are directly applied to the elastic supporters 141 and 142. As a result, generated forces (F2) act on each of the elastic supporters 141 and 142 and becomes equal to the respective forces (F1).

The force (F1) can be obtained through Equation 1, as follows:

$$F1 = inlB,\qquad\text{Equation 1}$$

wherein i denotes electric currents supplied to each of the focus coil 151 and 152, n denotes the number of winding coil in the respective focus coils 151 and 152, l denotes the lengths of the focus coils 151 and 152, and B denotes the respective magnetic fields.

The forces (F2) can be obtained through Equation 2, as follows:

$$F2 = kx \qquad\text{Equation 2}$$
$$k = \frac{12E}{L^3}\frac{\pi d^4}{64},$$

wherein k denotes elastic coefficients of the elastic supporters 141 and 142, x denotes pendent lengths of the elastic supporters 141 and 142, L denotes the lengths of the elastic supporters 141 and 142, E denotes a Young's modulus, and d denotes diameters of the elastic supporters 141 and 142. Here, it is noted that diameters of the elastic supporters 141 and 142 can also be controlled to control the elasticity of elastic supporters 141 and 142, and are not necessarily the same, according to an embodiment of the present invention; e.g., the diameter of external circumferential elastic supporter 141 may be less than the diameter of internal circumferential elastic supporter 142.

Herein, since F1 can equal F2, the below Equation 3 can be obtained from the combination of the Equations 1 and 2 above and, thus, the pendent lengths x of each of the elastic supporters 141 and 142 can be obtained.

$$x = \frac{inlB}{k},\qquad\text{Equation 3}$$

As described above, the pendent quantity of each of the elastic supporters 141 and 142, corresponding to the respective electric currents supplied to the focus coils 151 and 152, can be calculated based on the equations 1, 2 and 3. Based on the calculated pendent quantity, the tilt of the blade 130 can be calculated. Conversely, if the tilt of the blade 130 is known, the values of electric currents that should be supplied to each of the focus coils 151 and 152, independently, can be calculated. Also, it is possible to figure out the focus-directional change in the height of the blade 130 based on the pendent quantity of each elastic supporter 141 or 142. Here, the actual tilt of the optical disk (D) can be measured separately, and the change in the actual tilt can be figured out by measuring the tilt of the optical disk (D) at various locations, in the radial direction, a predetermined number of times.

From the above, the lookup tables stored in the memory 200 can thus be obtained, noting that embodiments of the present invention are not limited to the same.

The controller 300 can control the rotation rate of the spindle motor 510 by controlling the motor operator 520. The controller 300 can also move the optical pickup actuator 100 in the radial direction of the optical disk (D) by controlling the operation of the pickup operator 400, as well as controlling the magnetic operator 150 to obtain data of the electric current supplied to the magnetic operator 150 during a recording/reproducing data in/out of the optical disk (D) and a tilt difference between the tilt of the blade 130 and the actual tilt of the optical disk (D), based on the lookup table stored in the memory 200, to compensate for the tilt difference.

Hereafter, the controlling of another optical recording/reproducing apparatus will be described, in accordance with another embodiment of the present invention.

First, as depicted in FIG. 3 above, an actuator 100 includes a blade 130 that can be slanted according to differences in the elastic coefficients of elastic supporters 141 and 142 based on the change in the height of the blade 130.

Herein, again, lookup tables containing experimental data can be previously stored in the memory 200, as described above with reference to FIGS. 6 to 8.

With the optical pickup actuator 100 and the memory 200, the controller 300 can record/reproduce data to/from/the optical disk (D) by rotating the optical disk (D) and operating the optical pickup actuator 100.

During the data recording/reproduction, the controller 300 controls the magnetic operator 150 to control the location of the blade 130 by moving the blade 130 in the focus direction (A) and the tracking direction (T) to perform tilt compensation according to the slant amount of the optical disk (D).

Figure 9A:
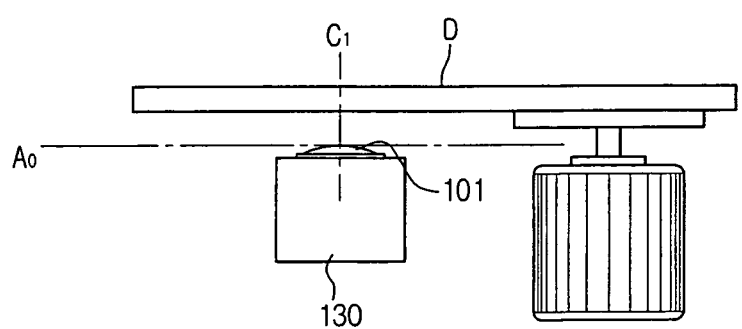
FIGS. 9A to 9B are diagrams illustrating the movement of a blade when data is recorded/reproduced in an optical disk, according to an embodiment of the present invention.

Herein, as shown in FIG. 9A, optical pickup can be performed centering around a predetermined pickup center ($C_1$) near the internal circumference of the optical disk (D) and the optical disk (D) is slanted, the area near the internal circumference will not be slanted much and the blade 130 can maintain the parallel state with the optical disk (D). Therefore, the blade 130 can perform optical pickup without any focus-directional change in height. Since the blade 130 does not have to change in height, it is not slanted and can maintain the parallel orientation with the optical disk (D).

Figure 9B:
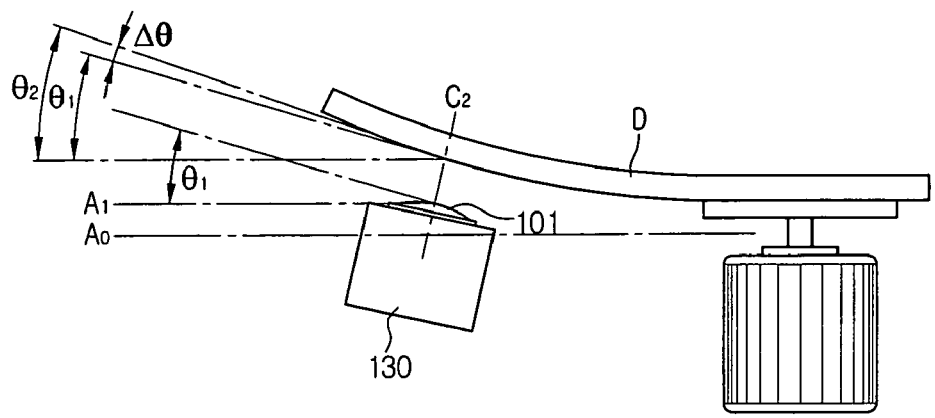

On the other hand, as illustrated in FIG. 9B, if the optical pickup is performed in a predetermined pickup center ($C_2$) near the external circumference of the optical disk (D), where the slanting extent of the optical disk (D) can be large. As shown in FIG. 9B, if the optical disk (D) is slanted upwards, predetermined current intensities can be supplied to the focus coils 151 and 152. Then, the blade 130 can be correspondingly raised to a predetermined height in the focus direction (A), to thereby compensate for the gap between the objective lens 101 and the optical disk (D). As the blade 130 is raised, it is slanted at a predetermined tilt ($\theta_1$) due to the differences in the elastic coefficients of the elastic supporters 141 and 142.

Herein, the controller 300 of FIG. 4 can acquire the values of the electric currents supplied to the focus coils 151 and 152. The controller 300 can further acquire the tilt ($\theta_1$) of the blade 130, based on the lookup table graphically illustrated in FIG. 7 and stored in the memory 200, and the acquired electric current values.

Figure 6:
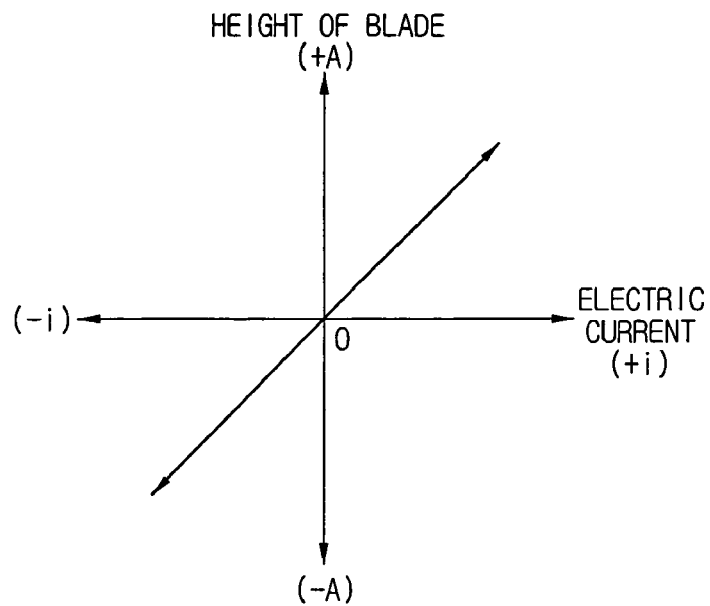
FIGS. 6 to 8 are graphs for lookup tables stored in a memory, individually.

In addition, the controller 300 can acquire data on the height of the blade 130 based on the lookup table graphically illustrated in FIG. 6 and the acquired electric current values.

Subsequently, the controller 300 can acquire the actual tilt of the optical disk (D) based on the lookup table graphically illustrated in FIG. 8 and the acquired data on the height of the blade 130.

Figure 10:
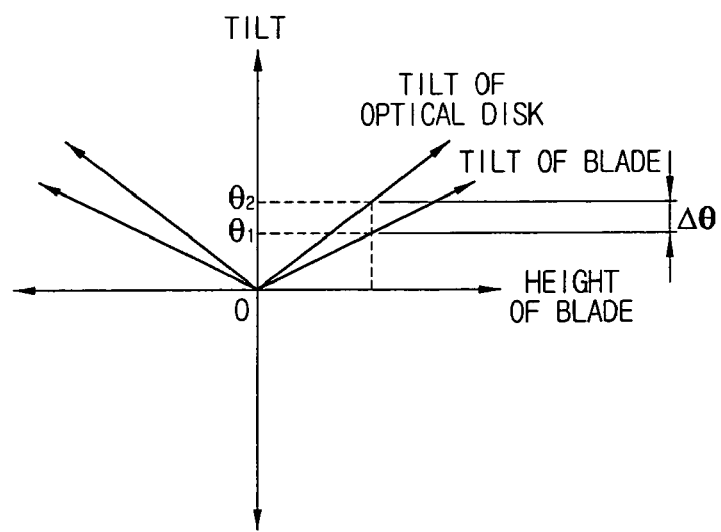
FIG. 10 is a graph comparing tilts between a blade and an optical disk of FIG. 9B, according to an embodiment of the present invention.

Through the above processes, as illustrated in FIG. 10, the controller 300 can acquire the tilt of the blade 130 and the actual tilt of the optical disk (D), and can therefrom compute the tilt difference by comparing the tilts. In short, if the optical disk (D) is greatly slanted, as illustrated in FIG. 9B, a predetermined tilt difference ($\Delta\theta$) is generated substantially between the tilt ($\theta_1$) of the blade 130, which can also change regularly according to the change in the height of the blade 130, and the actual tilt ($\theta_2$) of the optical disk (D).

The controller 300 can acquire the required change extent in the values of the electric currents that should be supplied to the focus coils 151 and 152 to compensate for the tilt difference ($\Delta\theta$) from the lookup table graphically illustrated in FIG. 7. Therefore, the controller 300 can, thus, control the tilt of the blade 130 by using the tilt difference ($\Delta\theta$) to change the values of electric currents to be supplied to the elastic supporters 141 and 142. As shown above, although the optical disk (D) is overly slanted, the blade can cope with the tilt of the optical disk (D) by operating the blade 130 to be slanted as much as the tilt difference ($\Delta\theta$).

Figure 11:
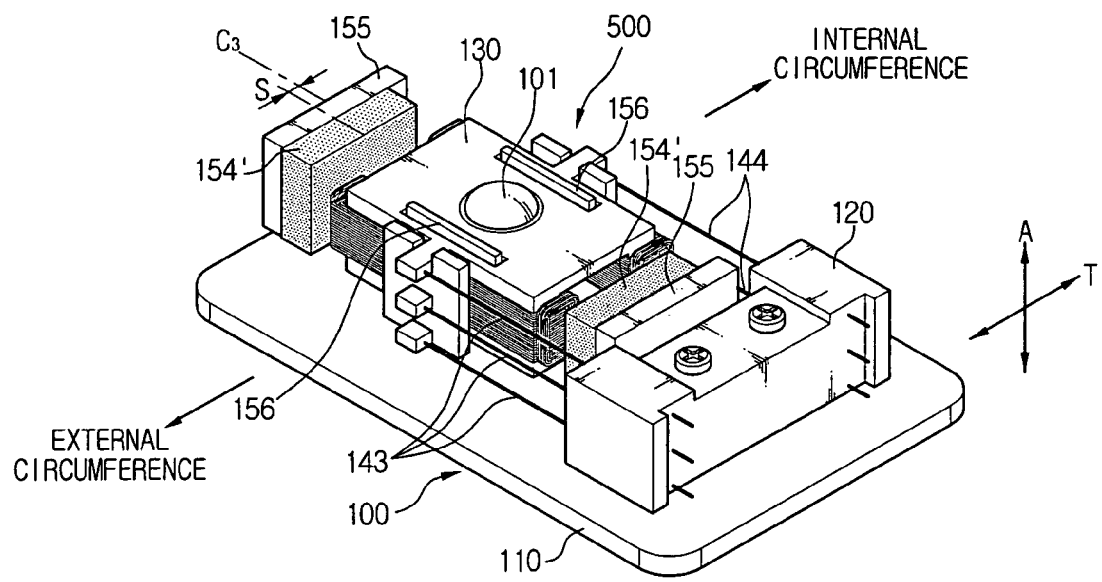
FIG. 11 is a perspective view illustrating an optical pickup actuator for an optical recording/reproducing apparatus, in accordance with still another embodiment of the present invention.

Also, in accordance with another embodiment of the present invention, illustrated in FIG. 11, the optical recording/reproducing apparatus may include an optical pickup actuator where magnets 154' are arranged to be inclined to one side with respect to the radial direction of the optical disk (D). Herein, the internal circumferential elastic supporters 144 and the external circumferential elastic supporters 143, connecting the blade 130 with the holder 120, can have the same rigidity and, preferably, the same length, according to an embodiment of the present invention, though the present invention is not limited thereto. Since similar elements, as those illustrated in FIGS. 3 and 5, are given the same reference numerals below, further detailed description for the same for this embodiment will be omitted, herein.

In this embodiment, the magnets 154' are set up a predetermined space (S) away from the central line ($C_3$) of the electromagnetic force so that the magnets 154' can generate asymmetrical electromagnetic forces with respect to each focus coil 151 and 152. Preferably, the magnets 154' are set up to be inclined toward the external circumference of the optical disk (D). In an embodiment of the present invention, the setup of the magnets 154' can be controlled by using a jig.

The operation of the optical pickup actuator having the above-described inclined structure is further discussed in Korean Patent No. 10-0403586 discloses, which can be referred to for further details.

In accordance with an embodiment of the present invention, the optical pickup actuator 500 of FIG. 11, having the above described structure, can acquire the tilt and height of the blade 130 and the actual tilt of the optical disk (D) by measuring the intensities of the electric currents supplied to the focus coils 151 and 152, just as described above in previous embodiments. Therefore, the tilt difference between the actual tilt of the optical disk (D) and the tilt of the blade 130 can be compensated.

In short, as described above, an optical pickup actuator, having a blade 130 whose tilt is changed according the height of the blade 130, can cope with a slanted optical disk excellently by using a pair of focus coils 151 and 152, operated independently, six elastic supporters, a memory 200 storing lookup tables, and a controller 300. It has an advantage that the recording capability is so improved that data can be recorded and/or reproduced normally even on an overly slanted optical disk.

As described above, the optical recording/reproducing apparatus and the controlling method thereof, can cope with slanted optical disks excellently by having two focus coils and one track coil and inducing rolling during the focusing operation of the blade.

Particularly, since the tilt difference between the actual tilt of the overly slanted optical disk and the tilt of the blade can be compensated, it is possible to cope with slanted optical disks of diverse slants.

Therefore, light passing through the objective lens can be focused precisely on the optical disk without optical distortion that previously may have been caused by the deflection error of the optical disk. Consequently, the recording/reproducing performance of the optical recording/reproducing apparatus on the optical disk can be improved.

Embodiments of the present invention may be implemented by a computer readable medium having computer readable code/instructions. The computer readable medium can include, but is not limited to, storage media such as magnetic storage media(EPROMs, ROMs, RAMs, floppy disks, magnetic tapes, etc.), and optically readable media (CD-ROMs, DVDs, etc.), for example, noting embodiments of the present invention are not limited to the same.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical recording and/or reproducing apparatus, comprising:
   an optical pickup actuator comprising a holder formed on a base, a blade comprising an objective lens and connected to the holder with a plurality of elastic supporters so that a posture of the blade can be changed to a predetermined tilt according to a variation in a height of the blade, a pair of focus coils for operating the blade in a focus direction, track coils for operating the blade in a tracking direction, and corresponding magnets;
   a memory to store at least one of a lookup table relating the height of the blade to an electric current supplied to at least one of the focus coils, a lookup table relating a tilt of the blade to at least the electric current supplied to the at least one focus coil, and a lookup table relating an actual tilt of an optical disk of the optical recording/reproducing apparatus to the height of the blade; and
   a controller to control electric current supplied to the at least one focus coil based on a calculated tilt difference between an expected tilt of the blade and a detected tilt of the optical disk, the expected tilt of the blade being based on an expected tilt for an electric current supplied for a desired focal blade height corresponding to a determined height relative to the optical disk to record and/or reproduce to/from the optical disk, with the controller controlling the electric current by adjusting the electric current based on a lookup table stored in the memory to compensate for the calculated tilt difference.

2. The optical recording and/or reproducing apparatus of claim 1, wherein the elastic supporters comprise:
   a plurality of internal circumferential elastic supporters disposed in the blade along an internal circumferential side of the optical disk connected to one of the focus coils; and
   a plurality of external circumferential elastic supporters disposed in the blade along an external circumferential side of the optical disk connected to another one of the focus coils,
   wherein the internal and external circumferential elastic supporters have different elastic coefficients so that the blade is slanted when the height of the blade is changed in the focus direction.

3. The optical recording and/or reproducing apparatus of claim 2, wherein the external circumferential elastic supporters are longer than the internal circumferential elastic supporters.

4. The optical recording and/or reproducing apparatus of claim 2, wherein the external circumferential elastic supporters have a narrower diameter than the internal circumferential elastic supporters.

5. The optical recording and/or reproducing apparatus of claim 2, wherein the focus coils are arranged along a radial direction of the optical disk and connected to at least one adjacent elastic supporter electrically.

6. The optical recording and/or reproducing apparatus of claim 5, wherein at least another one adjacent elastic supporter is not connected to the focus coils.

7. The optical recording and/or reproducing apparatus of claim 1, wherein the optical pickup actuator further comprises:
   external yokes formed on the base and fixing the corresponding magnets; and
   internal yokes arranged between the focus coils to guide a movement of the blade.

8. A method for controlling an optical recording and/or reproducing apparatus, comprising:
   controlling a posture of an optical pickup actuator, the optical pickup actuator comprising a blade with an objective lens movable in a focus direction by operation force generated by electric current supplied to focus coils, such that the posture of the blade is controlled to be slanted at a predetermined tilt based on a focus-directional change in height of the blade;
   calculating a tilt difference between an expected tilt of the blade and a detected tilt of an optical disk when the height of the blade changes in a focus direction to record and/or reproduce data in/out of the optical disk, the expected tilt of the blade being based on an expected tilt for an electric current supplied for a desired focal blade height corresponding to a determined height relative to the optical disk to record and/or reproduce to/from the optical disk; and
   compensating for the tilt difference by controlling an electric current supplied to at least one of the focus coils by controlling the electric current based on a lookup table stored in a memory to compensate for the calculated tilt difference.

9. The method of claim 8, wherein the controlling of the posture of the optical pickup actuator further comprises:
   fixing a holder on a base;
   connecting external and internal circumferences of the blade to the holder with a respective plurality of elastic supporters, each respective plurality of elastic supporters having different elastic coefficients, such that the blade is slanted in a radial direction of the optical disk when the height of the blade is changed; and
   setting up a magnetic operator comprising a pair of focus coils and track coils, and corresponding magnets to generate operation forces through interaction with the coils.

10. The method as recited in claim 9, wherein the setting up of the magnetic operator further comprises:
    winding the blade with the track coils;
    arranging the focus coils in the blade in the radial direction of the optical disk; and
    setting up the corresponding magnets, to generate the operation forces, in the base.

11. The method as recited in claim 9, wherein, the connecting of the external and internal circumference elastic supporters further comprises connecting the external elastic supporters to be longer than the internal elastic supporters.

12. The method as recited in claim 8, wherein the controlling of the posture of the optical pickup actuator further comprises:

fixing a holder on a base;

connecting the blade to the holder with a plurality of elastic supporters such that the height of the blade can be changed;

setting up a pair of focus coils in the blade; and setting up magnets on internal and external circumferential sides of the blade asymmetrically such that operation forces generated from interaction of at least one of the focus coils and at least one of the magnets acts on the internal and/or external circumferential sides of the blade asymmetrically with respect to the radial direction of the optical disk.

13. The method as recited in claim 12, wherein, in the setting up of the magnet on the internal and external circumferential sides of the blade, at least one of the magnets is inclined toward the external circumference of the blade.

14. The method of claim 8, wherein the optical pickup actuator further comprises a base, respective pluralities of elastic supporters along external and internal circumferences of the blade and connected to the holder, each respective plurality of elastic supporters having different elastic coefficients, such that the tilt of the blade changes when the height of the blade changes, and a magnetic operator comprising a pair of focus coils, track coils, and corresponding magnets for generating corresponding operation forces through interaction with the focus and/or track coils.

15. The method of claim 14, wherein the magnetic operator further comprises:

the track coils being wound on the blade;

the focus coils being arranged in the blade in the radial direction of the optical disk; and magnets in the base.

16. The method as recited in claim 14, wherein elastic supporters along the external circumference are longer than elastic supporters along the internal circumference of the blade.

17. The method as recited in claim 8, wherein the optical pickup actuator comprises a holder on a base, with the blade being connected to the holder through a plurality of elastic supporters so that the height of the blade can be changed, a pair of focus coils in the blade, and magnets along internal and external circumferential sides of the blade such that operation forces generated from an interaction of the magnets and the focus coils acts on the internal and external circumferential sides of the blade asymmetrically with respect to the radial direction of the optical disk.

18. The method as recited in claim 17, wherein the magnets are disposed to be inclined toward the external circumference of the blade.

19. A computer readable medium comprising computer readable code implementing the method of claim 8.

20. A method for controlling an optical recording and/or reproducing apparatus, comprising:

controlling a posture of an optical pickup actuator, the optical pickup actuator comprising a blade with an objective lens movable in a focus direction by operation force generated by electric current supplied to focus coils, such that the Posture of the blade is slanted at a predetermined tilt based on a focus-directional change in height of the blade;

acquiring a tilt difference between a tilt of the blade and a tilt of an optical disk when the height of the blade changes in a focus direction to record and/or reproduce data in/out of the optical disk; and compensating for the tilt difference by controlling an electric current supplied to at least one of the focus coils, wherein the acquiring of the tilt difference further comprises:

acquiring a value of electric current supplied to at least one of the focus coils for a change in height of the blade when data is recorded and/or reproduced in/out of the optical disk;

acquiring a lookup table for the change in height of the blade regarding the value of the electric current supplied to the at least one focus coil;

acquiring a lookup table for a tilt of the blade regarding the value of the electric current supplied to the at least one focus coil;

acquiring a lookup table for an actual tilt of the optical disk regarding the height of the blade; and acquiring the tilt difference between the tilt of the blade and the actual tilt of the optical disk.

21. The method as recited in claim 20, wherein lookup tables acquired in the acquiring of the tilt difference are pre-established and stored in a memory.

22. A computer readable medium comprising a lookup table relating a height of a blade to an electric current supplied to at least one focus coil of a pickup actuator, a lookup table relating a tilt of the blade to at least the electric current supplied to the one focus coil, and a lookup table relating an actual tilt of an optical disk of a recording/reproducing apparatus to the height of the blade in pickup actuator compensating for a computed tilt difference between the actual tilt and the tilt of the blade, such that a controller is enabled to control electric current supplied to at least one focus coil of an optical pickup actuator, of a optical recording and/or reproducing apparatus, based on a calculated tilt difference between an expected tilt of a blade of the optical pickup actuator and a detected tilt of an optical disk, the expected tilt of the blade being based on an expected tilt for an electric current supplied for a desired focal blade height corresponding to a determined height relative to the optical disk to record and/or reproduce to/from the optical disk, so that the controller is enabled to control the electric current by adjusting the electric current based on a lookup table of the computer readable medium to compensate for the calculated tilt difference.

23. A pickup actuator system, for an optical recording and/or reproducing apparatus, including an optical pickup actuator, and comprising a holder formed on a base, a blade comprising an objective lens and connected to the holder with a plurality of elastic supporters so that a posture of the blade can be changed to a predetermined tilt according to a variation in a height of the blade, a pair of focus coils for operating the blade in a focus direction, track coils for operating the blade in a tracking direction, and corresponding magnets, comprising:

a memory to store at least one of a lookup table relating the height of the blade to an electric current supplied to at least one of the focus coils, a lookup table relating a tilt of the blade to at least the electric current supplied to the at least one focus coil, and a lookup table relating an actual tilt of an optical disk of the optical recording/reproducing apparatus to the height of the blade; and a controller to control electric current supplied to the at least one focus coil based on a calculated tilt difference between an expected tilt of the blade and a detected tilt of the optical disk, the expected tilt of the blade being based on an expected tilt for an electric current supplied for a desired focal blade height corresponding to a determined height relative to the optical disk to record and/or reproduce to/from the optical disk, with the controller controlling the electric current by adjusting the electric current based on a lookup table stored in the memory to compensate for the calculated tilt difference.

24. An optical recording and/or reproducing apparatus, comprising:

an optical pickup actuator comprising a holder formed on a base, a blade comprising an objective lens and connected to the holder with a plurality of elastic supporters so that a posture of the blade can be changed to a predetermined tilt according to a variation in a height of the blade, a pair of focus coils for operating the blade in a focus direction, track coils for operating the blade in a tracking direction, and corresponding magnets;

a memory to store a lookup table relating the height of the blade to an electric current supplied to at least one of the focus coils, a lookup table relating a tilt of the blade to at least the electric current supplied to the at least one focus coil, and a lookup table relating an actual tilt of an optical disk of the optical recording/reproducing apparatus to the height of the blade; and a controller to compute a tilt difference between the optical disk and the blade and controlling at least the electric current supplied to at least the one focus coil to compensate for the computed tilt difference by using data of at least the electric current supplied to at least the one focus coil and the lookup table relating the height of the blade to the electric current supplied to the at least one of the focus coils, the lookup table relating the tilt of the blade to the at least the electric current supplied to the at least one focus coil, and the lookup table relating the actual tilt of the optical disk of the optical recording/reproducing apparatus to the height of the blade.

25. A method for controlling an optical recording and/or reproducing apparatus, comprising:

controlling a posture of an optical pickup actuator, the optical pickup actuator comprising a blade with an objective lens movable in a focus direction by operation force generated by electric current supplied to focus coils, such that the posture of the blade is slant at a predetermined tilt based on a focus-directional change in height of the blade;

acquiring a tilt difference between a tilt of the blade and a tilt of an optical disk when the height of the blade changes in a focus direction to record and/or reproduce data in/out of the optical disk; and compensating for the tilt difference by controlling an electric current supplied to at least one of the focus coil by using data of at least the electric current supplied to at least the one focus coil and a lookup table relating the height of the blade to an electric current supplied to at least one of the focus coils, a lookup table relating a tilt of the blade to at least the electric current supplied to the at least one focus coil, and a lookup table relating an actual tilt of an optical disk of the optical recording/reproducing apparatus to the height of the blade.

* * * * *

UNITED STATES PATENT AND TRADEMARK OFFICE
CERTIFICATE OF CORRECTION

| | |
|---|---|
| PATENT NO. | : 7,724,616 B2 |
| APPLICATION NO. | : 11/159179 |
| DATED | : May 25, 2010 |
| INVENTOR(S) | : Bong-gi Kim et al. |

It is certified that error appears in the above-identified patent and that said Letters Patent is hereby corrected as shown below:

Column 13, Line 59 replace "Posture" with --posture--.

Signed and Sealed this

Seventh Day of September, 2010

David J. Kappos
*Director of the United States Patent and Trademark Office*